United States Patent
Korb et al.

(10) Patent No.: US 7,658,129 B2
(45) Date of Patent: *Feb. 9, 2010

(54) METHOD OF MAKING A COMPOSITE UTILITY BLADE

(75) Inventors: William B. Korb, Melrose, CT (US); Brian K. Douglas, Enfield, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 653 days.

This patent is subject to a terminal disclaimer.

(21) Appl. No.: 10/792,415

(22) Filed: Mar. 3, 2004

(65) Prior Publication Data

US 2004/0168326 A1   Sep. 2, 2004

Related U.S. Application Data

(62) Division of application No. 09/916,018, filed on Jul. 26, 2001, now Pat. No. 6,701,627.

(51) Int. Cl.
*B21K 11/00* (2006.01)
*B26B 21/58* (2006.01)

(52) U.S. Cl. ........................... 76/104.1; 30/350

(58) Field of Classification Search ........... 30/2, 30/335, 346, 346.5, 346.53, 346.54, 346.55, 30/346.58, 346.61, 350, 351; 76/104.1, 112

See application file for complete search history.

(56) References Cited

U.S. PATENT DOCUMENTS 882,413 A   3/1908   Parkison
1,434,295 A  * 10/1922  Lang ............................. 83/855
1,732,244 A   9/1929   Salzman
1,734,554 A  * 11/1929  Behrman ....................... 76/104.1
2,093,874 A   9/1937   Stargardter (Continued)

FOREIGN PATENT DOCUMENTS

AT   400545 BB   6/1995

(Continued)

OTHER PUBLICATIONS

Undated Product Catalog for Lutz KG, Solingen, Germany; received by applicant Jun. 1, 2001; pp. 3-20.

(Continued)

*Primary Examiner*—Hwei-Siu C Payer
(74) *Attorney, Agent, or Firm*—McCarter & English, LLP

(57) ABSTRACT

A composite utility knife blade and method of making such a blade involves butt joining a tool steel wire to a front edge of an alloy steel backing strip. The wire is electron beam welded to the backing strip to form a composite strip defining a first metal portion formed by the alloy steel backing strip, a second metal portion formed by the tool steel wire, and a weld region joining the first and second metal portions. The composite strip is then annealed, and the annealed strip is straightened to eliminate any camber therein. The annealed composite strip is then hardened such that the first metal portion defines a surface hardness within the range of approximately 38 Rc to approximately 52 Rc, and the second metal portion defines a surface hardness within the range of approximately 60 Rc to approximately 57 Rc.

47 Claims, 7 Drawing Sheets

U.S. PATENT DOCUMENTS

| | | | |
|---|---|---|---|
| 2,286,047 A * | 6/1942 | Young | 30/346.53 |
| 3,107,426 A | 10/1963 | Robinson, Jr. | |
| 3,279,283 A | 10/1966 | Craig | |
| 3,315,548 A | 4/1967 | Anderson et al. | |
| RE26,676 E | 9/1969 | Anderson et al. | |
| 3,681,846 A | 8/1972 | Gerber | |
| 3,685,373 A | 8/1972 | Norfolk | |
| 3,703,766 A * | 11/1972 | Tibbals | 30/346.53 |
| 3,766,808 A * | 10/1973 | Cremisio et al. | 76/112 |
| 3,894,337 A * | 7/1975 | Jones | 30/346.54 |
| 3,911,579 A | 10/1975 | Lane et al. | |
| 4,109,380 A | 8/1978 | Anderson | |
| 4,232,096 A | 11/1980 | Franzen et al. | |
| 4,277,888 A | 7/1981 | Szabo | |
| 4,321,098 A | 3/1982 | Hayden | |
| 4,408,396 A * | 10/1983 | Scholl | 30/294 |
| 4,896,424 A | 1/1990 | Walker | |
| 4,922,610 A | 5/1990 | Szabo | |
| 5,091,264 A | 2/1992 | Daxelmueller et al. | |
| 5,142,785 A | 9/1992 | Grewal et al. | |
| 5,283,954 A | 2/1994 | Szabo | |
| 5,317,938 A | 6/1994 | de Juan, Jr. et al. | |
| 5,337,482 A | 8/1994 | Schmidt | |
| 5,417,777 A | 5/1995 | Henderer | |
| 5,575,185 A * | 11/1996 | Cox et al. | 76/107.1 |
| 5,613,300 A | 3/1997 | Schmidt | |
| 5,701,788 A * | 12/1997 | Wilson et al. | 76/104.1 |
| 5,706,583 A * | 1/1998 | Gengenbach | 30/166.3 |
| 5,842,387 A | 12/1998 | Marcus et al. | |
| 5,875,551 A * | 3/1999 | Huang | 30/151 |
| 5,918,525 A | 7/1999 | Schramm | |
| 5,940,970 A | 8/1999 | D'Ambro, Sr. et al. | |
| 5,940,975 A | 8/1999 | Decker et al. | |
| 6,026,575 A * | 2/2000 | Wonderley | 30/125 |
| 6,105,261 A | 8/2000 | Ecer | |
| 6,423,427 B1 * | 7/2002 | Mehmood | 428/682 |
| 2004/0158995 A1 * | 8/2004 | Dunn-Rankin | 30/355 |
| 2004/0187314 A1 * | 9/2004 | Johnson | 30/162 |

FOREIGN PATENT DOCUMENTS

| | | |
|---|---|---|
| CA | 970661 | 7/1975 |
| CH | 382595 | 12/1964 |
| CH | 637057 | 7/1983 |
| CH | 671917 | 10/1989 |
| CH | 685152 | 4/1995 |
| CH | 685482 | 7/1995 |
| CN | 2275509 Y | 1/1998 |
| DE | 376421 | 5/1923 |
| DE | 138 410 A1 | 10/1979 |
| DE | 9303186 U1 | 7/1993 |
| DE | 4445755 A1 | 9/1995 |
| JP | 59 024925 | 2/1984 |
| JP | 2000 237469 | 9/2000 |
| WO | 95/00300 A1 | 1/1995 |
| WO | WO98/38246 | 9/1998 |

OTHER PUBLICATIONS

Undated Industrial/DIY Product Catalog, The Jewel Razor Company Ltd., Sheffield, England; pp. 2-5.

Product Catalog, American Safety Razor Company, Verona, Virginia; Jul. 1999; pp. 1-21.

Supplemental Price List, American Safety Razor Company, Verona, Virginia; 1998; pp. 1-2.

Undated Product Catalog, Mozart AG, Solingen, Germany; received by applicant May 31, 2001; pp. 1-6 with inserts.

Undated Product Catalog, U.S. Blade Manufacturing Company, Cranford, New Jersey; pp. 1-11.

Supplementary European Search Report for European Application No. EP 02 75 6699 dated Apr. 11, 2005.

International Search Report of International Application No. PCT/US02/23800 dated Sep. 18, 2002.

Undated Szabo Document with English Translation.

S. Szabo AG Trademark Registration with English Translation of Line Items.

* cited by examiner

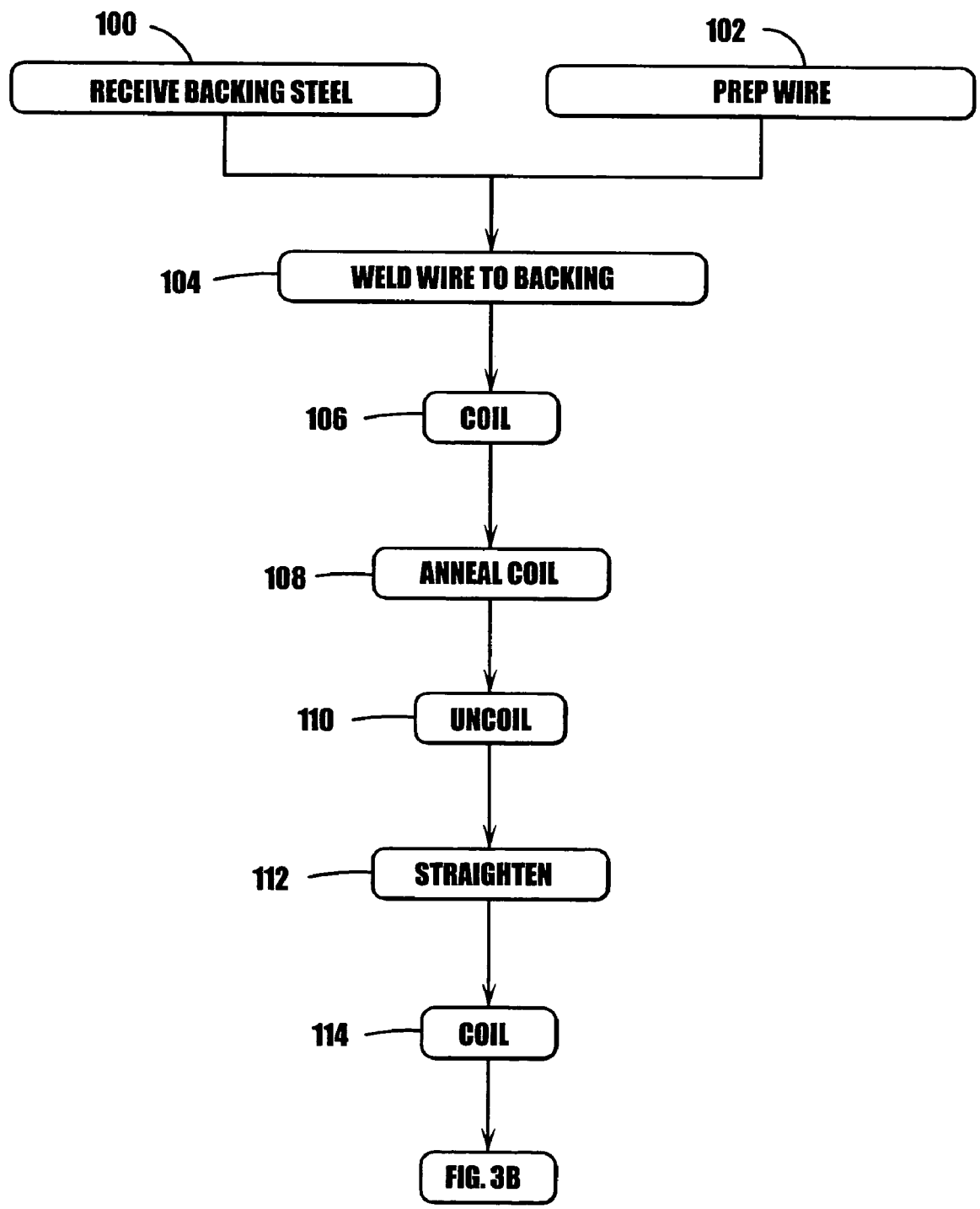

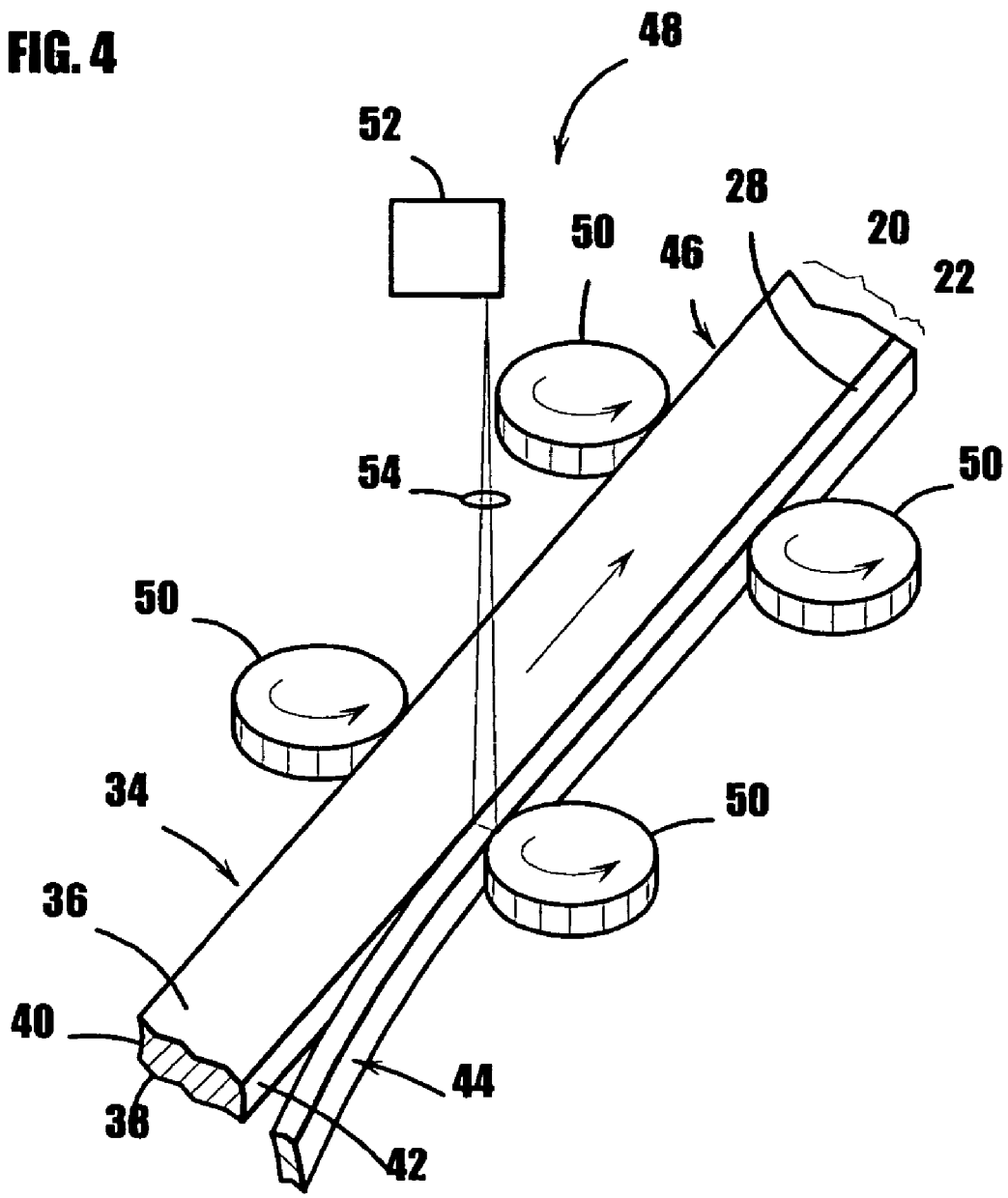

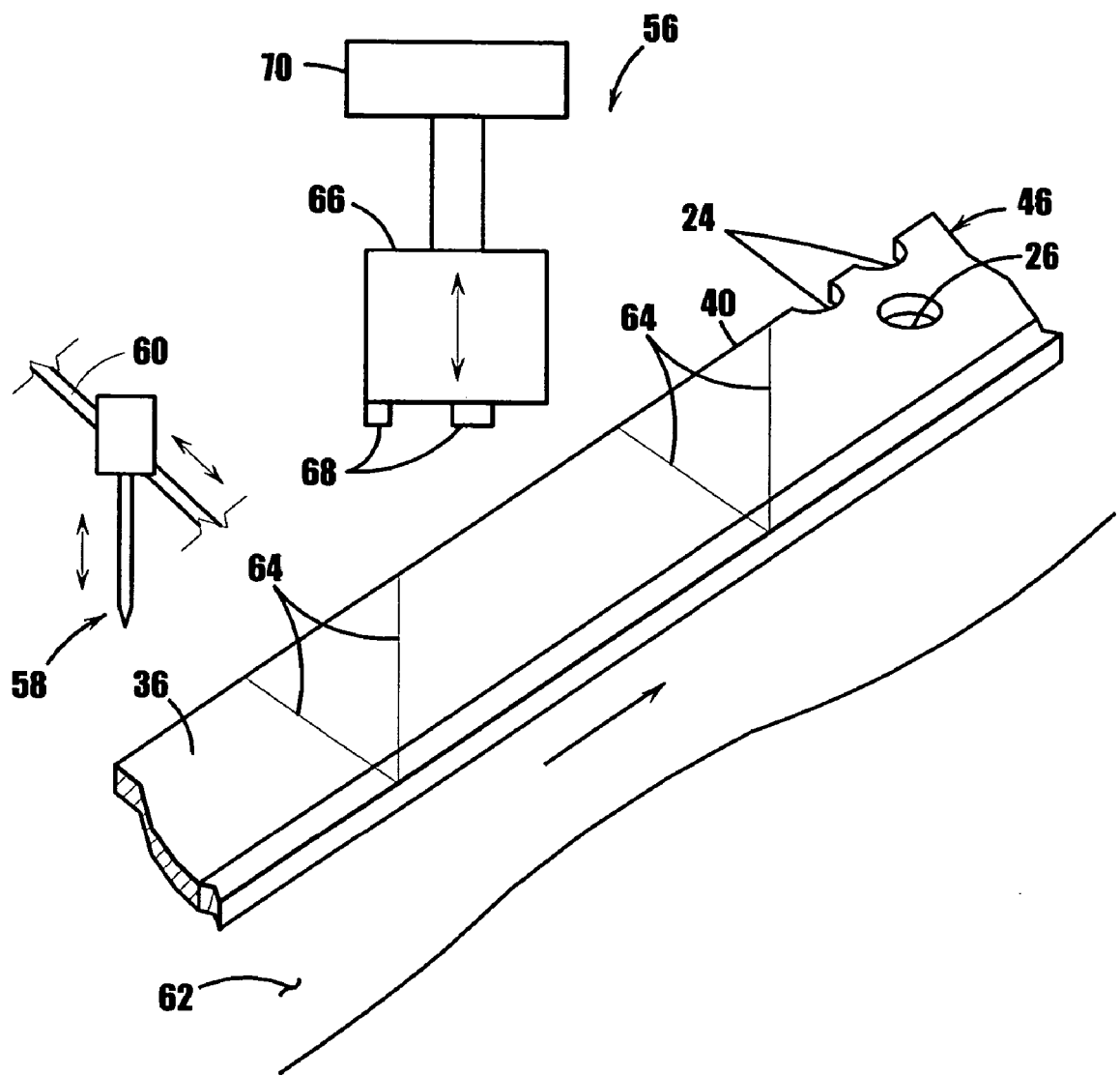

METHOD OF MAKING A COMPOSITE UTILITY BLADE

CROSS-REFERENCE TO RELATED APPLICATIONS

This patent application is a divisional of U.S. patent application Ser. No. 09/916,018, filed Jul. 26, 2001, now U.S. Pat. No. 6,701,627, entitled "Composite Utility Knife Blade, and Method of Making Such a Blade", which is hereby expressly incorporated by reference as part of the present disclosure. This application is related to U.S. patent application Ser. No. 10/202,703, filed Jul. 24, 2002, entitled "Composite Utility Knife Blade, and Method of Making Such a Blade", which is a continuation-in-part of parent application Ser. No. 09/916,018, now U.S. Pat. No. 6,701,627.

FIELD OF THE INVENTION

The present invention relates to utility knife blades, and more particularly, to composite utility knife blades wherein the outer cutting edge of the blade is made of a highly wear-resistant alloy, and a backing portion of the blade is made of an alloy selected for toughness, such as spring steel. The present invention also relates to methods of making such composite utility knife blades.

BACKGROUND INFORMATION

Conventional utility knife blades are made of carbon steel and define a back edge, a cutting edge located on an opposite side of the blade relative to the back edge, and two side edges located on opposite sides of the blade relative to each other and extending between the back and cutting edges of the blade. A pair of notches are typically formed in the back edge of the blade for engaging a locator in a blade holder. Typically, the back, cutting and side edges of the blade define an approximately trapezoidal peripheral configuration.

Conventional utility knife blades are manufactured by providing a carbon steel strip, running the strip through a punch press to punch the notches at axially spaced locations on the strip, and stamping a brand name, logo or other identification thereon. Then, the strip is scored to form a plurality of axially spaced score lines, wherein each score line corresponds to a side edge of a respective blade and defines a preferred breaking line for later snapping the scored strip into a plurality of blades. The punched and scored strip is then wound again into a coil, and the coil is hardened and tempered. The hardening and tempering operations may be performed in a "pit-type" vacuum furnace wherein the coils are repeatedly heated and cooled therein. Alternatively, the hardening and tempering operations may be performed "in-line", wherein the strip is unwound from the coil and successively driven through a series of furnaces and quenching stations to harden and temper the strip. The carbon steel strip is typically heat treated to a surface hardness of about 58 Rockwell "c" ("Rc"), and thus defines a relatively hard and brittle structure.

The heat treated strip is then ground, honed and stropped in a conventional manner to form the facets defining a straight cutting edge along one side of the strip. Then, the strip is snapped at each score line to, in turn, break the strip along the score lines and thereby form from the strip a plurality of trapezoidal shaped utility knife blades. Because the entire strip is relatively hard and brittle (about 58 Rc), the strip readily breaks at each score line to thereby form clean edges at the side of each blade.

One of the drawbacks associated with such conventional utility knife blades is that each blade is formed of a single material, typically carbon steel, that is heat treated to a relatively hard and brittle state, typically about 58 Rc. Thus, although such blades define a relatively hard, wear-resistant cutting edge, the entire blade is also relatively brittle, and therefore is subject to premature breaking or cracking in use. In addition, the cutting edges of such conventional blades are frequently not as wear resistant as might otherwise be desired. However, because the entire blade is made of the same material, any increase in hardness, and thus wear resistance of the cutting edge, would render the blade too brittle for practical use. As a result, such conventional utility knife blades are incapable of achieving both the desired wear resistance at the cutting edge, and overall toughness to prevent cracking or premature breakage during use. Another drawback of such convention utility knife blades is that the carbon steel typically used to make such blades corrodes relatively easily, thus requiring premature disposal of the blades and/or costly coatings to prevent such premature corrosion.

Certain prior art patents teach composite utility knife blades defining sandwiched, laminated, or coated constructions. For example, U.S. Pat. No. 4,896,424 to Walker shows a utility knife having a composite cutting blade formed by a body section 16 made of titanium, and a cutting edge section 18 made of high carbon stainless steel and connected to the body section by a dovetail joint 25.

U.S. Pat. Nos. 3,279,283, 2,093,874, 3,681,846, and 6,105,261 relate generally to laminated knives or razor blades having cutting edges formed by a core layer made of a high carbon steel or other relatively hard material, and one or more outer layers made of relatively softer materials. Similarly, U.S. Pat. Nos. 3,911,579, 5,142,785, and 5,940,975 relate to knives or razor blades formed by applying a relatively hard carbon coating (or diamond like coating ("DLC")) to a steel substrate. In addition, U.S. Pat. Nos. 5,317,938 and 5,842,387 relate to knives or razor blades made by etching a silicon substrate.

One of the drawbacks associated with these laminated, sandwiched and/or coated constructions, is that they are relatively expensive to manufacture, and therefore have not achieved widespread commercial use or acceptance in the utility knife blade field.

In stark contrast to the utility knife blade field, bi-metal band saw blades have been used in the saw industry for many years. For example, U.S. Reissue Pat. No. 26,676 shows a method of making bi-metal band saw blades wherein a steel backing strip and high speed steel wire are pre-treated by grinding and degreasing, and the wire is welded to the backing strip by electron beam welding. Then, the composite band stock is straightened and annealed. The sides of the annealed stock are then dressed, and the band saw blade teeth are formed in the high speed steel edge of the composite stock by milling. Then, the teeth are set and the resulting saw blade is heat treated. There are numerous methods known in the prior art for heat treating such band saw blades. For example, International Published Patent Application No. WO 98/38346 shows an apparatus and method for in-line hardening and tempering composite band saw blades wherein the blades are passed around rollers and driven repeatedly through the same tempering furnace and quenching zones. The heat treated composite band saw blades are then cleaned and packaged.

Although such bi-metal band saw blades have achieved widespread commercial use and acceptance over the past 30 years in the band saw blade industry, there is not believed to be any teaching or use in the prior art to manufacture utility knife blades defining a bi-metal or other composite construction as with bi-metal band saw blades. In addition, there are numerous obstacles preventing the application of such band saw blade technology to the manufacture of utility knife blades. For example, as described above, conventional utility knife blades are manufactured by forming score lines on the carbon steel strip, and then snapping the strip along the score lines to break the strip into the trapezoidal-shaped blades. However, the relatively tough, spring-like backing used, for example, to manufacture bi-metal band saw blades, cannot be scored and snapped. Rather, such relatively tough materials require different processes to form the utility knife blades from a heat treated, composite strip. In addition, the heat treating applied to conventional utility knife blades could not be used to heat treat bi-metal or other composite utility knife blades.

Accordingly, it is an object of the present disclosure to overcome one or more of the above-described drawbacks and disadvantages of prior art utility knife blades and methods of making such blades, and to provide a bi-metal or other composite utility knife blade defining a relatively hard, wear-resistant cutting edge, and a relatively tough, spring-like backing, and a method of making such utility knife blades.

SUMMARY OF THE INVENTION

The present disclosure is directed to a composite utility knife blade comprising a back edge, a cutting edge located on an opposite side of the blade relative to the back edge, and two side edges located on opposite sides of the blade relative to each other and extending between the back and cutting edges of the blade. Preferably, the back, cutting and side edges of the blade define an approximately trapezoidal peripheral configuration. The composite utility knife blade further defines first and second metal portions, wherein the first metal portion extends between the back edge and the second metal portion, and further extends from approximately one side edge to the other side edge of the blade. The first metal portion is formed of an alloy steel heat treated to a hardness within the range of approximately 38 Rc to approximately 52 Rc. The second metal portion defines the cutting edge, and extends from approximately one side edge to the other side edge, and is formed of a high speed or tool steel heat treated to a hardness within the range of approximately 60 Rc to approximately 75 Rc. A weld region of the blade joins the first and second metal portions and extends from approximately one side edge to the other side edge of the blade.

The present invention is also directed to a method of making composite utility knife blades. The method comprises the steps of providing an elongated wire formed of high speed or tool steel, and an elongated backing strip formed of an alloy steel and defining an approximately planar upper side, an approximately planar lower side, and opposing back and front edges extending between the upper and lower sides. The wire is butt joined to the front edge of the backing strip. Then, thermal energy is applied to the interface between the wire and backing strip to weld the wire to the backing strip and, in turn, form a composite strip defining a first metal portion formed by the steel backing strip, a second metal portion formed by the high speed steel wire, and a weld region joining the first and second metal portions. The composite strip is then annealed, and the annealed strip is straightened to eliminate any camber or other undesirable curvatures in the annealed composite strip. Then, a plurality of notches are formed, such as by punching, in axially spaced locations relative to each other along the back edge of the first metal portion of the annealed composite strip. The annealed and punched composite strip is then hardened such that the first metal portion defines a surface hardness within the range of approximately 38 Rc to approximately 52 Rc, and the second metal portion defines a surface hardness within the range of approximately 60 Rc to approximately 75 Rc. The hardened strip is then subjected to at least one, and preferably two, tempering and quenching cycles. Then, facets are formed on the edge of the second metal portion, such as by grinding, honing and stropping, to in turn form an approximately straight, high speed or tool steel cutting edge along the side of the composite strip opposite the back edge of the first metal portion. The composite strip is then die cut along shear lines axially spaced relative to each other. Each shear line is oriented at an acute angle relative to the back edge of the first metal portion, and at least one notch is located between adjacent shear lines. The die cutting of the composite strip forms a plurality of utility knife blades, wherein each utility knife blade defines an approximately trapezoidal peripheral configuration and at least one notch is formed in the back edge thereof.

In accordance with an alternative embodiment of the present invention, prior to hardening, the high speed or tool steel edge of the composite strip is cut, such as by punching, at the interface of each shear line and the second metal portion, to thereby separate the high speed steel cutting edges of adjacent composite utility knife blades formed from the composite strip. Then, during the die-cutting step, only the first metal portion of the hardened composite strip is die cut along the axially spaced shear lines to thereby form the plurality of utility knife blades from the composite strip.

One advantage of the utility knife blades and method of the present invention is that they provide an extremely hard, wear-resistant cutting edge, and an extremely tough, spring-like backing, particularly in comparison to the conventional utility knife blades as described above. Thus, the utility knife blades and method of the present invention provide significantly improved blade life, and cutting performance throughout the blade life, in comparison to conventional utility knife blades. In addition, the utility knife blades, and method of making such blades, are relatively cost effective, particularly in comparison to the composite utility knife blades defining sandwiched, laminated and/or coated constructions, as also described above. As a result, the utility knife blades and method of the present invention provide a combination of wear resistance, toughness, cutting performance, and cost effectiveness heretofore believed to be commercially unavailable in utility knife blades.

Other objects and advantages of the present invention will become readily apparent in view of the following detailed description of preferred embodiments and accompanying drawings.

BRIEF DESCRIPTION OF THE DRAWINGS

FIGS. 3A and 3B are flow charts illustrating conceptually the procedural steps involved in the method of making the composite utility knife blades in accordance with the present invention.

FIG. 4 is a somewhat schematic, perspective view of an apparatus for welding a high speed steel wire to a spring-steel backing to form bi-metal utility knife blades in accordance with the present invention.

FIG. 5 is a somewhat schematic, perspective view of an apparatus for scoring and punching bi-metal strips in order to make bi-metal utility knife blades in accordance with the present invention.

DETAILED DESCRIPTION OF THE PREFERRED EMBODIMENTS

Figure 1:
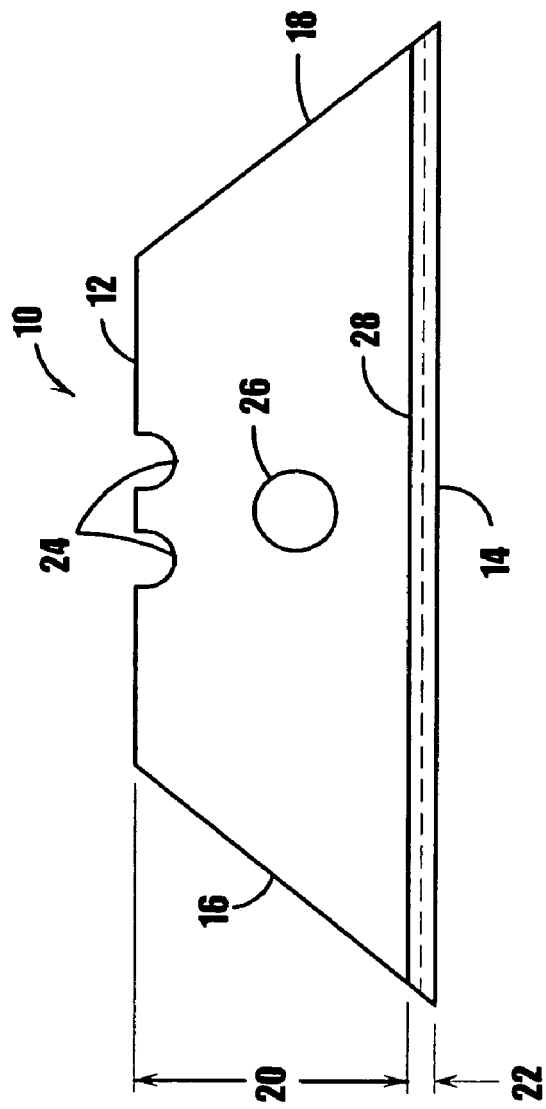
FIG. 1 is a top plan view of a composite utility knife blade made in accordance with the method of the present invention.

In FIG. 1, a composite utility knife blade made in accordance with the method of the present invention is indicated generally by the reference numeral 10. The utility knife blade 10 defines a back edge 12, a cutting edge 14 located on an opposite side of the blade relative to the back edge, and two side edges 16, 18 located on opposite sides of the blade relative to each other and extending between the back and cutting edges of the blade. As shown typically in FIG. 1, the back, cutting and side edges of the blade preferably define an approximately trapezoidal peripheral configuration.

The blade 10 further defines a first metal portion 20 and a second metal portion 22. As shown typically in FIG. 1, the first metal portion 20 extends between the back edge 12 and the first metal portion 22, and further extends from approximately one side edge 16 to the other side edge 18. In accordance with the present invention, the first metal portion 20 is formed of a steel, typically referred to as an "alloy" steel, that is heat treated to a surface hardness within the range of approximately 38 Rockwell "c" (referred to herein as "Rc") to approximately 52 Rc. The second metal portion 22 defines the cutting edge 14 and extends from approximately one side edge 16 to the other side edge 18. In accordance with the present invention, the second metal portion 22 is formed of a steel, typically referred to as a "high speed" or "tool" steel, that is heat treated to a surface hardness within the range of approximately 60 Rc to approximately 75 Rc.

The first metal portion 20 defines a spring-like backing that is relatively pliable, tough, and thus highly resistant to fatigue and cracking. The second metal portion 22, on the other hand, is relatively hard and highly wear resistant, and thus defines an ideal, long-lasting cutting blade. As a result, the composite utility knife blades made in accordance with the method of the present invention define highly wear-resistant, long-lasting cutting edges, combined with virtually unbreakable or shatter-proof backings. Thus, in stark contrast to the typical utility knife blades of the prior art, the composite utility knife blades made in accordance with the method of the present invention provide a cost-effective blade exhibiting both improved wear resistance and toughness heretofore commercially unavailable in such blades.

The first metal portion 20 of blade 10 is preferably made of any of numerous different grades of steel capable of being heat treated to a surface hardness within the preferred range of approximately 38 Rc to approximately 52 Rc, such as any of numerous different standard AISI grades, including 6135, 6150 and D6A. The second metal portion 22, on the other hand, is preferably made of any of numerous different types of wear-resistant steel capable of being heat treated to a surface hardness within the preferred range of approximately 60 Rc to approximately 75 Rc, such as any of numerous different standard AISI grades, including, without limitation, M Series grades, such as M1, M2, M3, M42, etc., A Series grades, such as A2, A6, A7 A9, etc., H Series grades, such as H10, H11, H12, H13, etc., and T Series grades, such as T1, T4, T8, etc.

As may be recognized by those skilled in the pertinent art based on the teachings herein, the currently preferred materials used to construct the first and second metal portions 20 and 22 and disclosed herein are only exemplary, and numerous other types of metals that are currently or later become known for performing the functions of the first and/or second metal portions may be equally employed to form the composite utility knife blades in accordance with the present invention.

As further shown in FIG. 1, each composite utility knife blade 10 defines a pair of cut outs or notches 24 formed in the back edge 12 and laterally spaced relative to each other. As shown typically in FIG. 1, each notch 24 defines a concave, approximately semi-circular profile, and is provided to engage a corresponding locator mounted within a blade holder (not shown) in order to retain the blade in the blade holder. As may be recognized by those skilled in the pertinent art based on the teachings herein, the notches 24 may take any of numerous different shapes and/or configurations, and the blade may include any number of such notches or other recesses that are currently or later become known to those skilled in the pertinent art for performing the function of engaging a blade holder, or the blade actuating mechanism or locator of such a holder.

As also shown in FIG. 1, the blade 10 further defines a registration aperture 26 extending through the first metal portion in an approximately central portion of the blade. As described further below, the registration aperture 26 is provided to receive a blade positioning device to position the blade in a die cutter during the process of making the blades in accordance with the present invention. As may be recognized by those skilled in the pertinent art based on the teachings herein, the aperture 26 may take any of numerous different shapes or configurations, and the blade may include any number of such apertures or other structural features for performing the function of properly positioning the blade in a die cutting or other manufacturing apparatus. In addition, the registration aperture(s) 26 may be located in any of numerous different locations on the utility knife blade, or may be located within the scrap material adjacent the blade and within the bi-metal strip from which the blade is formed.

As further shown in FIG. 1, the blade 10 defines a weld region 28 formed between the first and second metal portions 20 and 22, respectively, and defining an approximate line of joinder extending from one side edge 16 to the other side edge 18. As described in further detail below, the second metal portion is joined to the first metal portion 20 by applying thermal energy to the interface, such as by electron beam welding, to thereby weld the first metal portion to the second metal portion and form a resulting weld region defining a line of joinder between the two different metal portions.

Figure 2:
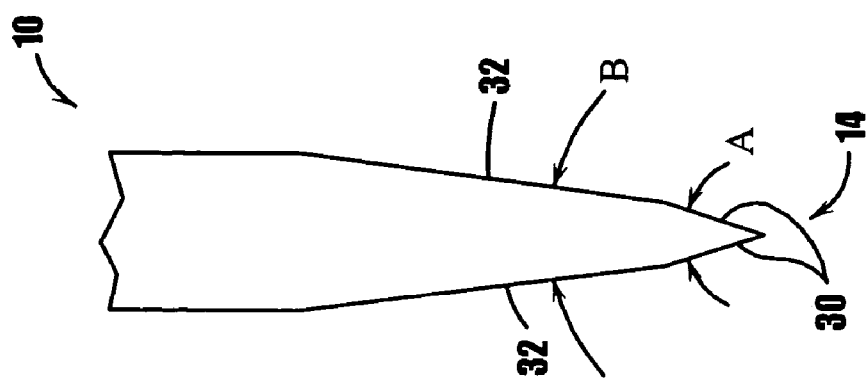
FIG. 2 is partial, end elevational view of the composite utility knife blade of FIG. 1 showing the multi-faceted cutting edge of the blade.

As also shown in FIG. 1, the cutting edge 14 defines an approximately straight cutting edge extending from one side edge 16 to the other side edge 18. As shown in FIG. 2, the cutting edge 14 preferably defines first facets 30 located on opposite sides of the blade relative to each other, and second facets 32 spaced laterally inwardly and contiguous to the respective first facets 30. As shown typically in FIG. 2, the first facets 30 define a first included angle "A", and the second facets 32 define a second included angle "B". Preferably, the second included angle B is less than the first included angle A. In the currently preferred embodiment of the present invention, the first included angle A is approximately 26° and the second included angle B is approximately 18°. However, as may be recognized by those skilled in the pertinent art based on the teachings herein, these included angles are only exemplary and may be set as desired depending upon the physical properties and/or proposed applications of the blade. As may be further recognized by those skilled in the pertinent art, the utility knife blades made in accordance with the method of the present invention may include any number of facets.

Figure 3B:
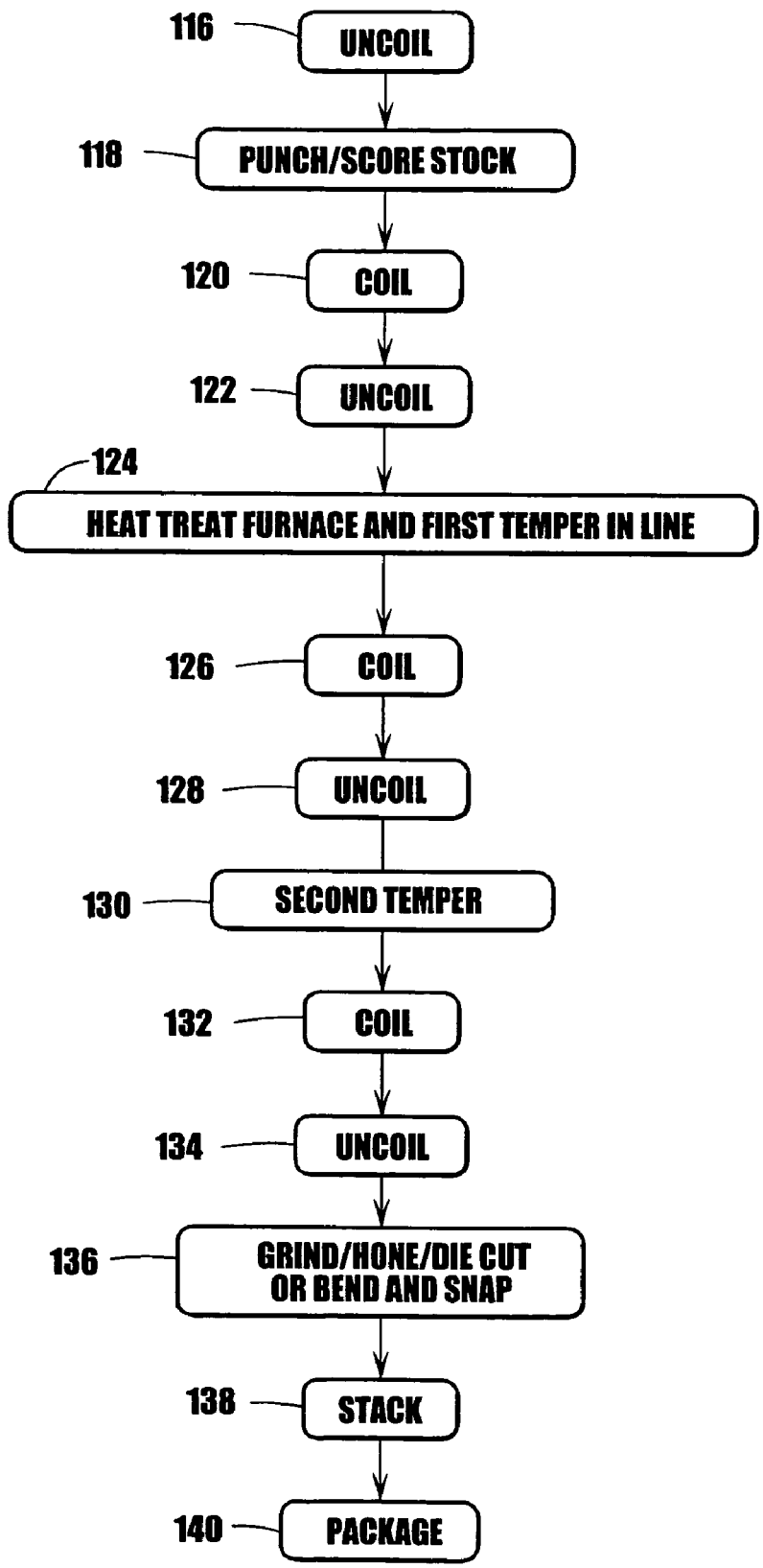

Turning to FIGS. 3A and 3B, the method of making the composite utility knife blades in accordance with the present invention is hereinafter described in further detail. As shown at steps 100 and 102, the backing steel forming the first metal portion 20 and the high speed or tool steel wire forming the second metal portion 22 are cleaned and otherwise prepared for welding in a manner known to those of ordinary skill in the pertinent art. As shown in FIG. 4, the backing steel is preferably provided in the form of one or more continuous elongated strips 34 wound into one or more coils. Each backing strip 34 defines an approximately planar upper side 36, an approximately planar lower side 38, and opposing back and front edges 40 and 42, respectively. Similarly, the high speed or tool steel wire is preferably provided in the form of one or more continuous lengths of wire 44 wound into one or more coils.

At step 104 of FIG. 3A, the high speed or tool steel wire 44 is butt joined to the front edge 42 of the backing strip 34, and thermal energy is applied to the interface between the wire and the backing strip to, in turn, weld the wire to the backing strip and form a bi-metal or composite strip 46 defining the first metal portion 20 formed by the steel backing strip 34, the second metal portion 22 formed by the high speed steel wire 44, and the weld region 28 joining the first and second metal portions. As shown in FIG. 4, a typical welding apparatus 48 includes opposing rollers 50 laterally spaced relative to each other for butt joining the high speed steel wire 44 to the front edge 42 of the backing strip 34, and rotatably driving the composite or bi-metal strip 46 through the welding apparatus. A thermal energy source 52 is mounted within the welding apparatus 48 and applies thermal energy to the interface of the high speed steel wire 44 and front edge 42 of the backing strip to weld the wire to the backing strip. In the currently preferred embodiment of the present invention, the thermal energy source 52 transmits an electron beam 54 onto the interface of the high speed steel wire and backing strip to electron beam weld the wire to the backing strip. However, as may be recognized by those skilled in the pertinent art based on the teachings herein, any of numerous other energy sources and/or joining methods that are currently or later become known for performing the functions of the electron beam welding apparatus may be equally employed in the method of the present disclosure. For example, the energy source for welding the high speed steel wire to the backing strip may take the form of a laser or other energy source, and welding processes other than electron beam welding may be equally used.

As shown at step 106 of FIG. 3A, after welding the wire to the backing strip, the bi-metal strip 46 may then be coiled for annealing and/or for transporting the strip to an annealing station. As shown at step 108, the bi-metal strip 46 is annealed in a manner known to those of ordinary skill in the pertinent art. Typically, the bi-metal strips 46 are annealed in a vacuum furnace of a type known to those of ordinary skill in the pertinent art wherein a plurality of coils are vertically mounted relative to each other on a thermally conductive rack, and the rack is mounted in an evacuated furnace to soak the coils at a predetermined annealing temperature for a predetermined period of time. In the currently preferred embodiment of the present invention, the bi-metal strips 46 are annealed at a temperature within the range of approximately 1400° F. to approximately 1600° F. for up to approximately 5 hours. Then, the heated coils are allowed to cool at a predetermined rate in order to obtain the desired physical properties. For example, the coils may be cooled within the evacuated furnace initially at the rate of about 50° F. per hour until the coils reach approximately 1000° F., and then the coils may be allowed to cool at a more rapid rate. As may be recognized by those skilled in the pertinent art based on the teachings herein, these temperatures and times are only exemplary, however, and may be changed as desired depending upon any of numerous different factors, such as the particular materials, constructions and/or dimensions of the bi-metal strip 46, the type of welding process used to weld the wire to the backing, and/or the desired physical properties of the resulting blades.

After annealing, the bi-metal strip 46 is then uncoiled, if necessary, as shown at step 110, and the strip is straightened, as shown at step 112. After welding and annealing, the bi-metal strip 46 may develop a significant camber or other undesirable curvatures, and therefore such curvatures must be removed prior to further processing. In the currently preferred embodiment of the present invention, the bi-metal strip 46 is mechanically straightened by passing the strip through a series of pressurized rolls in a straightening apparatus of a type known to those of ordinary skill in the pertinent art, such as the Bruderer™ brand apparatus. However, as may be recognized by those skilled in the pertinent art based on the teachings herein, any of numerous straightening apparatus that are currently or later become known for performing the function of straightening metal articles like the bi-metal strip 46 may be equally employed. For example, as an alternative to the mechanical straightening apparatus, the bi-metal strip 46 may be straightened by applying heat and tension thereto in a manner known to those of ordinary skill in the pertinent art.

As shown at step 114, the straightened bi-metal strip 46 may be coiled again, if necessary, for transportation and further processing. As shown at step 116 of FIG. 3B, the annealed and straightened bi-metal strip 46 is then uncoiled, if necessary. At step 118, the bi-metal strip is punched to form a plurality of notches or other cut outs 24 axially spaced relative to each other along the back edge 40 of the annealed bi-metal strip, and is scored to form a plurality of shear lines defining the side edges 16 and 18 of each blade. As shown in FIG. 5, a typical apparatus for performing the punching and scoring operations on the bi-metal strip 46 is indicated generally the reference numeral 56. The apparatus 56 includes a scoring instrument 58 mounted on a support 60 above a work support surface 62 supporting the bi-metal strip 46 thereon. As indicated by the arrows in FIG. 5, the scoring instrument is movable vertically into and out of engagement with the bi-metal strip, and is movable laterally relative to the strip. Thus, as shown typically in FIG. 5, the scoring tool 58 is controlled to engage the upper surface 36 of the bi-metal strip and move laterally across the strip to, in turn, score the upper surface of the strip and thereby form a plurality of score lines 64 axially spaced relative to each other on the strip and each defining a side edge 16 or 18 of a respective utility knife blade 10 (FIG. 1). The apparatus 56 further includes a punch 66 defining a plurality of cutting surfaces 68, each corresponding in shape and position to a respective notch 24 and aperture 26. As shown in FIG. 5, the punch 56 is drivingly connected to drive source 70, such as a hydraulic cylinder, and is movable into and out of engagement with the bi-metal strip seated on the work support surface 62 for cutting the notches 24 and aperture 26 in the bi-metal strip. As will be recognized by those of ordinary skill in the pertinent art based on the teachings herein, the scoring tool 58 and punch 66 may be computer-controlled to automatically drive the scoring tool and punch into and out of engagement with the bi-metal strip, and a driving mechanism (not shown) may be employed to automatically index the bi-metal strip relative to the scoring tool and punch. Similarly, the scoring tool and punch may be mounted in different apparatus or work stations than each other, and/or may each take the form of any of numerous other tools that are currently or later become known for either applying the score lines to the bi-metal strip, or cutting the notches and/or apertures in the bi-metal strip.

As shown at step 120 of FIG. 3B, the punched and scored bi-metal strip 46 may be coiled again, if necessary, for either temporary storage or transportation to the hardening and tempering stations. At step 122, the bi-metal strip is then uncoiled, if necessary, and at step 124, the uncoiled strip is hardened and tempered. As may be recognized by those of ordinary skill in the pertinent art based on the teachings herein, the hardening and tempering operations may be performed in accordance with any of numerous different hardening and tempering processes and apparatus that are currently known, or later become known for hardening and tempering articles like the bi-metal strip 46. In the currently preferred embodiment of the present invention, the bi-metal strip 46 is hardened at a temperature within the range of approximately 2000° F. to approximately 2200° F. for a hardening time period within the range of about 3 to about 5 minutes. Then, after hardening, the bi-metal strip is tempered within a first tempering cycle at a temperature within the range of approximately 1000° F. to approximately 1200° F. for a tempering time within the range of about 3 to about 5 minutes. After the first tempering cycle, the bi-metal strip is quenched by air cooling to room temperature. In the currently preferred embodiment of the present invention, the hardening and tempering cycles are performed "in-line" such that the bi-metal strip is continuously driven first through an elongated hardening furnace, then through a first elongated tempering furnace, then through a quenching station, and then through at least one more tempering furnace and quenching station. However, as may be recognized by those of ordinary skill in the pertinent art based on the teachings herein, the bi-metal strip may be repeatedly passed through the same tempering furnace and quenching station(s), and/or may be wound into coils and hardened, tempered and quenched in a "pit-type" or other furnace. In addition, the quenching may be an air quench as described herein, or may be an oil quench or other type of quench that is currently, or later becomes known for quenching tempered articles of the type disclosed herein. Similarly, the composite strip may be subjected to any number of tempering and quenching cycles as may be required in order to obtain the desired physical characteristics of the resulting blades.

At step 126, the tempered and quenched bi-metal strip 46 is coiled again, if necessary, for transportation to the next tempering station, and at step 128, the bi-metal strip is uncoiled for the second tempering cycle. As discussed above, these and other coiling and uncoiling steps can be eliminated by providing one or more in-line stations for processing the bi-metal strip. At step 130, the bi-metal strip is tempered again within a second tempering cycle at a temperature within the range of approximately 1000° F. to approximately 1200° F. for a tempering time within the range of about 3 to about 5 minutes. After the second tempering cycle, the bi-metal strip is quenched to room temperature. In the currently preferred embodiment, the quench is an air quench; however, as discussed above, this quench may take the form any of numerous other types of quenching processes that are currently or later become known for articles of the type disclosed herein. Then, at step 132 the tempered and quenched bi-metal strip is coiled again either for temporary storage and/or transportation to the grinding and punching stations.

At step 134, the annealed, hardened and tempered bi-metal strip 46 is uncoiled again, if necessary, and at 136, the bi-metal strip is subjected to grinding, honing, stropping, and die-cutting or bend and snap steps. More specifically, the bi-metal strip 46 is ground, honed and stropped in a manner known to those of ordinary skill in the pertinent art to form the facets 30 and 32 of FIG. 2, and thereby define a straight, high-speed or toolsteel cutting edge along the side of the composite strip opposite the back edge of the first metal portion. Then, the ground, honed and stropped bi-metal strip 46 is die cut or bent and snapped along the score or shear lines 64 of FIG. 5 to thereby form a plurality of utility knife blades from the composite strip, wherein each utility knife blade defines an approximately trapezoidal peripheral configuration with the notches 24 and central aperture 26 formed therein, as shown typically in FIG. 1.

Figure 6:
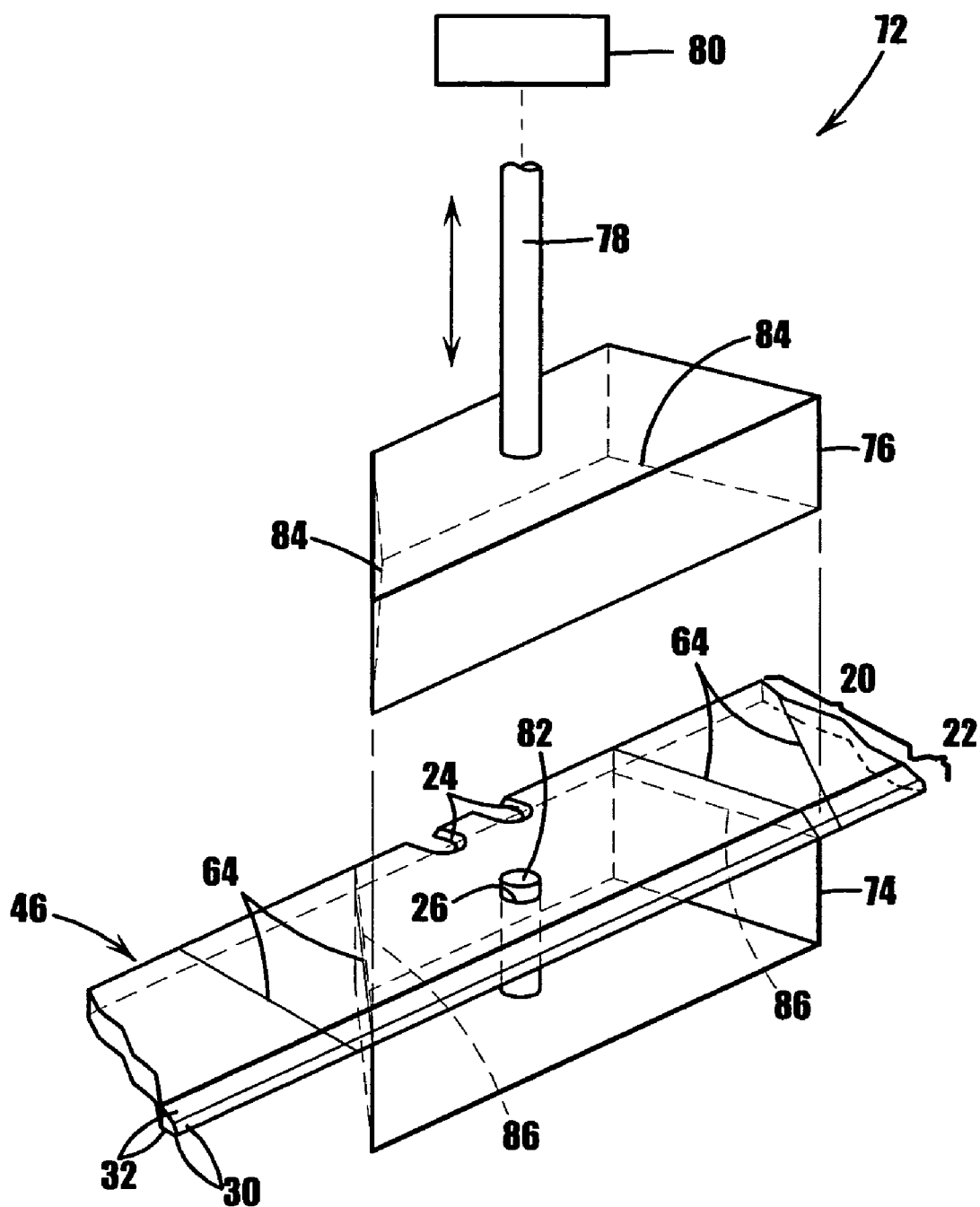
FIG. 6 is a somewhat schematic, perspective view of an apparatus for die cutting bi-metal strips in accordance with the present invention.

As shown in FIG. 6, a typical apparatus for die cutting the bi-metal strip is indicated generally by the reference numeral 72. The apparatus 72 comprises male and female dies 74 and 76, respectively, wherein the female die 76 is connected to a shaft 78 and the shaft is, in turn, drivingly connected to a hydraulic cylinder or like drive source 80 for moving the female die 78 into and out of engagement with the bi-metal strip 46 overlying the male die 74. The male die 74 includes a locator pin 82 projecting upwardly therefrom and received within the apertures 26 of the bi-metal strip to thereby properly locate the bi-metal strip between the male and female dies. As shown in phantom in FIG. 6, the female die 76 includes blade-like edges 84, and the male die 74 includes opposing blade-like edges 86 overlying and underlying respectively the shear lines 64 of the portion of the bi-metal strip 46 received between the dies. Then, in order to die cut the strip, the drive source 80 is actuated to drive the female die 76 downwardly and into engagement with the bi-metal strip such that the female and male blade-like edges 84 and 86, respectively, cooperate to shear the bi-metal strip along the shear lines and thereby form a respective utility knife blade, as shown typically in FIG. 1. During this die-cutting operation, because of the relative hardness of the first and second metal portions 20 and 22, respectively, of the bi-metal strip, the strip is sheared by the blade-like edges along the score lines 64 within the first metal portion 20, and is snapped by the blade-like edges along the portions of the score lines within the relatively hard and brittle second portion 22. Thus, the score lines provide desired break lines (or a desired "crack path") within the relatively hard and brittle second metal portion, and therefore are important to providing clean and sharp edges in these regions of the blades.

In accordance with an alternative embodiment of the present invention, and as shown typically in FIG. 7, the bi-metal strip 46 may be punched prior to hardening at step 124 in order to avoid the need to later cut the relatively hard and brittle high speed steel edge at step 136, and thereby prevent any possible damage to the cutting edge 14 and facets 30 and 32 formed thereon that might otherwise occur during die-cutting. As shown typically in FIG. 7, an apparatus for punching the high-speed steel edge in accordance with the present invention is indicated generally by the reference numeral 88. The apparatus 88 includes a punch or like tool 90 mounted on a tool support 92 over a work support surface 94 for supporting the bi-metal strip 46 thereon. The tool support 92 is drivingly connected to a hydraulic cylinder or like drive source 96 for driving the punch 90 into and out of engagement with the high speed steel edge 14 of the bi-metal strip 46. As shown typically in FIG. 7, the punch 90 is shaped and configured to form a notch 98 at the interface of each score line 64 and the high speed steel edge or second metal portion 22. Thus, as shown typically in FIG. 7, each notch 98 extends along the respective score line at least throughout the second metal portion 22 of the score line to thereby separate the high speed steel portion of the respective blade from the remainder of the bi-metal strip at the score lines. Then, when the bi-metal strip 46 is die cut as shown in FIG. 6, the dies need only cut the first metal portion 20 of the strip along the score lines and need not die cut the high speed steel edge portions. As described above, the first metal portion 20 is relatively pliable and significantly less hard than the second metal portion 22, and therefore the first metal portion 20 may be easily and cleanly die cut along the score lines 64. After hardening, the second metal portion 22 may be relatively difficult to die cut because of the relative hardness and brittleness of this portion. However, prior to hardening, the high speed steel edge exhibits a surface hardness within the range of about 25 Rc, and therefore may be relatively easily and cleanly punched at this stage of the process. Accordingly, the alternative process and construction of FIG. 7 may facilitate the ability to avoid any damage to the hardened, high speed steel edge, that might otherwise occur when die cutting such edge.

Figure 7:
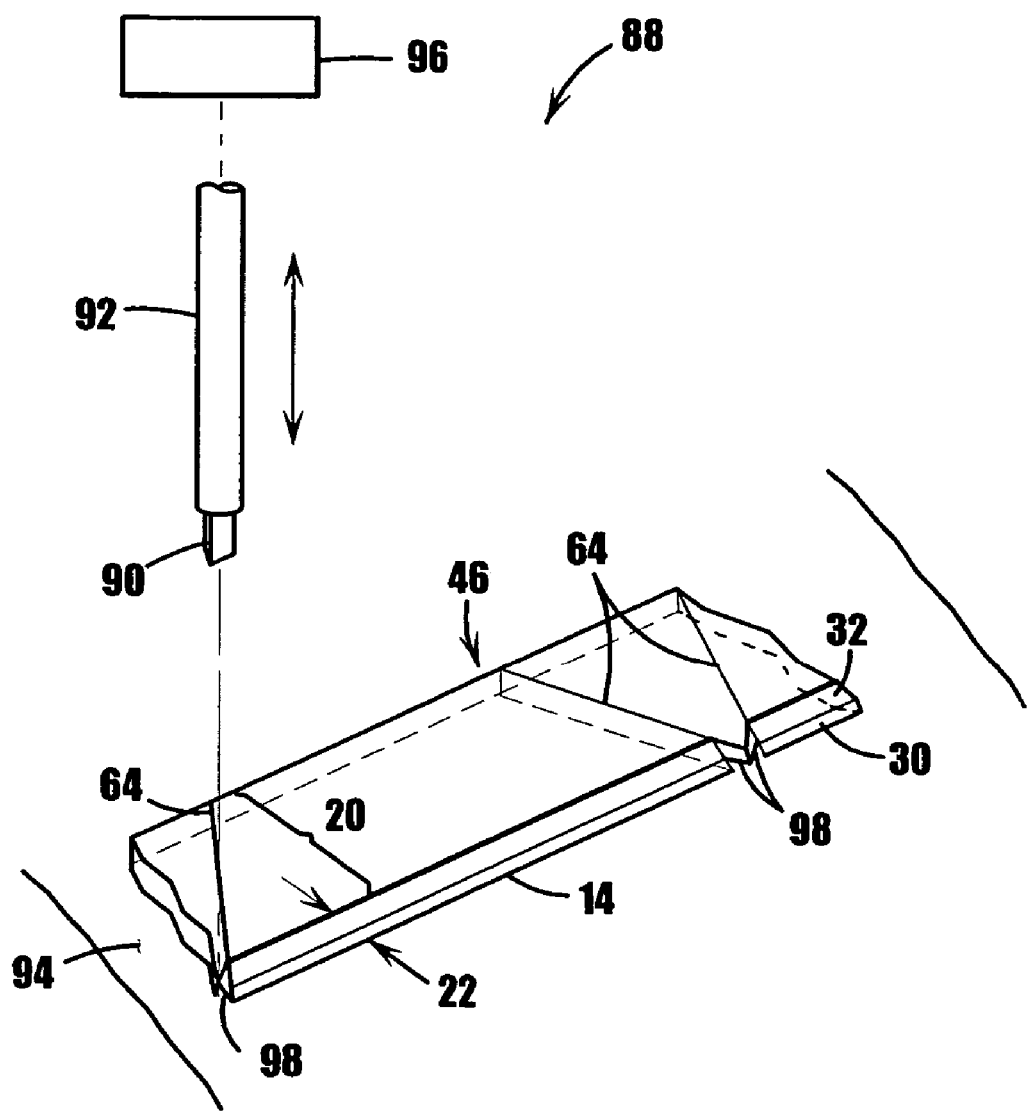
FIG. 7 is a somewhat schematic, perspective view of an apparatus for punching notches in the high-speed steel edges of the bi-metal strips prior to hardening the strips in accordance with the present invention, and the resulting notched strip.

The notches 98 of FIG. 7 are shown as v-shaped notches. However, as may be recognized by those of ordinary skill in the pertinent art, these notches or cut outs may take any of numerous different shapes that may be required to separate the high speed steel edge portions of each blade from the remainder of the composite strip at the score or shear lines. As may be further recognized by those skilled in the pertinent art based on the teachings herein, it may be possible in the alternative embodiment of the present invention to eliminate the score lines because the score lines may be unnecessary in certain circumstances for purposes of die cutting the first metal portion 20 of the bi-metal strip.

Turning against to FIG. 3B, at step 138 the blades are stacked, and at step 140, the stacked blades are packaged in a manner known to those of ordinary skill in the pertinent art.

As may be recognized by those skilled in the pertinent art based on the teachings herein, numerous changes and modifications may be made to the above-described and other embodiments of the composite utility knife blades and the methods of making such blades of the present invention without departing from the scope of the invention as defined in the appended claims. For example, although the composite utility knife blades 10 illustrated herein define a bi-metal construction, the blades made in accordance with the present invention may equally define a tri-metal or other composite construction. For example, the utility knife blades made in accordance with the present invention may equally define high speed or tool steel cutting edges formed on opposite sides of the blade relative to each other, with a relatively tough, spring-like portion formed between the outer high speed or tool steel edges. Similarly, a tri-metal strip may be cut down the middle, or otherwise cut along an axially-extending line to form two bi-metal strips which each may, in turn, be cut to form the blades in accordance with the present invention. In addition, many, if not all, of the coiling and uncoiling steps shown in FIGS. 3A and 3B may be eliminated by employing in-line processing apparatus. Moreover, the blades need not necessarily define a trapezoidal peripheral configuration, but rather may define a rectangular or other peripheral configuration as desired or otherwise required by a particular tool or application. Accordingly, this detailed description of preferred embodiments is to be taken in an illustrative, as opposed to a limiting sense.

What is claimed is:

1. A method of making composite utility knife blades, wherein each blade comprises a back edge, a cutting edge located on an opposite side of the blade relative to the back edge, two side edges located on opposite sides of the blade relative to each other and extending between the back and cutting edges of the blade, first and second metal portions, and a weld region, wherein the first metal portion forms a backing extending between the back edge and the weld region and further extending from approximately one side edge to the other side edge, the second metal portion defines the cutting edge and extends from approximately one side edge to the other side edge, and the weld region joins the first and second metal portions and extends from approximately one side edge to the other side edge of the blade, the method comprising the steps of:

providing an elongated wire formed of wear-resistant steel, and an elongated backing strip formed of steel and defining an approximately planar upper side, an approximately planar lower side, and opposing back and front edges extending between the upper and lower sides;

joining the wire to the front edge of the backing strip;

applying thermal energy to an interface between the wire and the backing strip to weld the wire to the backing strip, and forming a composite strip defining a first metal portion formed by the steel backing strip, a second metal portion formed by the wear-resistant steel wire, and a weld region joining the first and second metal portions;

annealing the composite strip;

straightening the annealed composite strip;

hardening the annealed composite strip;

tempering the hardened composite strip;

quenching the hardened composite strip;

forming at least one facet into the second metal portion, and forming an approximately straight wear-resistant steel cutting edge along the side of the composite strip opposite the back edge of the first metal portion; and die cutting at least one of the first and second metal portions along shear lines axially spaced relative to each other to thereby form a plurality of utility knife blades from the composite strip.

2. A method of making composite utility knife blades as defined in claim 1, wherein each shear line is define by a score.

3. A method of making composite utility knife blades as defined in claim 1, further comprising the steps of:

prior to hardening, cutting the wear-resistant steel edge of the composite strip at the interface of each shear line and the second metal portion to thereby separate the wear-resistant steel cutting edges of adjacent composite utility knife blades formed from the composite strip; and die-cutting only the first metal portion of the hardened composite strip along the axially spaced shear lines to thereby form the plurality of utility knife blades from the composite strip.

4. A method of making composite utility knife blades as defined in claim 1, wherein the first metal portion is hardened to define a surface hardness within the range of approximately 38 Rc to approximately 52 Rc.

5. A method of making composite utility knife blades as defined in claim 1, wherein the second metal portion is hardened to define a surface hardness within the range of approximately 60 Rc to approximately 75 Rc.

6. A method of making composite utility knife blades as defined in claim 1, further comprising the steps of:
joining a second wear-resistant steel wire to the back edge of the backing strip;
applying thermal energy to an interface of the second wire and the backing strip to weld the second wire to the backing strip; and
forming at least one facet in the wear-resistant steel edge formed by the second wire to, in turn, form a second approximately straight wear-resistant steel cutting edge along the side of the composite strip opposite the other cutting edge.

7. A method of making composite utility knife blades as defined in claim 1, further comprising the step of forming a plurality of utility knife blades defining approximately trapezoidal peripheral configurations or rectangular peripheral configurations.

8. A method of making a composite utility knife blade, the method comprising:
providing an elongated wire formed of wear-resistant steel, and an elongated backing strip formed of steel and defining a first side, a second side, and opposing lateral edges extending between the first and second sides;
placing the wire in contact with a lateral edge of the backing strip;
applying thermal energy to an interface between the wire and the backing strip to weld the wire to the backing strip, and forming a composite strip defining a first metal portion formed by the steel backing strip, a second metal portion formed by the wear-resistant steel wire, and a weld region joining the first and second metal portions and extending from approximately one end of the second metal portion to approximately the other end of the second metal portion;
forming a plurality of apertures in the first metal portion that are axially spaced relative to each other;
heat treating the composite strip;
forming at least one facet into the second metal portion and, in turn, forming an approximately straight wear-resistant steel cutting edge on the composite strip; and
separating the composite strip at a plurality of axially spaced locations between axially spaced apertures in the first metal portion to thereby form a composite utility knife blade from the composite strip including an aperture in the first metal portion thereof for engaging a blade holder, or the blade actuating mechanism or locator of a blade holder.

9. A method as defined in claim 8, further comprising hardening the first metal portion to a surface hardness within the range of approximately 38 Rc to approximately 52 Rc.

10. A method as defined in claim 8, further comprising hardening the second metal portion to a surface hardness within the range of approximately 60 Rc to approximately 75 Rc.

11. A method as defined in claim 8, further comprising hardening the first metal portion to a first hardness, and hardening the second metal portion to a second hardness greater than the first hardness.

12. A method as defined in claim 8, further comprising forming the first metal portion of spring steel and the second metal portion of tool steel.

13. A method as defined in claim 8, further comprising the steps of:
scoring the composite strip at axially spaced locations relative to each other to form a plurality of score lines defining a plurality of blade sections therebetween; and
separating the composite strip at a plurality of the score lines to thereby form a plurality of composite utility knife blades from the composite strip.

14. A method as defined in claim 8, further comprising forming a composite utility knife blade defining an approximately straight wear-resistant cutting edge extending from approximately one side edge to approximately an opposite side edge of the blade.

15. A method as defined in claim 8, wherein the heat treating comprises annealing, hardening and tempering the composite strip.

16. A method as defined in claim 15, wherein the annealing is at a temperature within the range of approximately 1400° F. to approximately 1600° F.

17. A method as defined in claim 15, wherein the hardening is at a temperature within the range of approximately 2000° F. to approximately 2200° F.

18. A method as defined in claim 15, wherein the tempering is at a temperature within the range of approximately 1000° F. to approximately 1200° F.

19. A method as defined in claim 8, further comprising forming the plurality of apertures and separating the composite strip to, in turn, form a composite utility knife blade including a plurality of axially-spaced apertures in the first metal portion thereof.

20. A method as defined in claim 19, wherein the method further comprises forming the apertures as notches or cutouts in an edge portion of the first metal portion.

21. A method of making composite utility knife blades, the method comprising:
providing an elongated wire formed of wear-resistant steel, and an elongated backing strip formed of steel and defining a first side, a second side, and opposing lateral edges extending between the first and second sides;
placing the wire in contact with a lateral edge of the backing strip;
applying thermal energy to an interface between the wire and the backing strip to weld the wire to the backing strip, and forming a composite strip defining a first metal portion formed by the steel backing strip, a second metal portion formed by the wear-resistant steel wire, and a weld region joining the first and second metal portions and extending from approximately one end of the second metal portion to approximately the other end of the second metal portion;
heat treating the composite strip;
forming at least one facet into the second metal portion, and forming an approximately straight wear-resistant steel cutting edge on the composite strip; and
die cutting at least one of the first and second metal portions along shear lines axially spaced relative to each other to thereby form a plurality of utility knife blades from the composite strip.

22. A method as defined in claim 21, further comprising hardening the first metal portion to a first hardness, and hardening the second metal portion to a second hardness greater than the first hardness.

23. A method as defined in claim 21, further comprising hardening the first metal portion to a surface hardness within the range of approximately 38 Rc to approximately 52 Rc.

24. A method as defined in claim 21, further comprising hardening the second metal portion to a surface hardness within the range of approximately 60 Rc to approximately 75 Rc.

25. A method of making composite utility knife blades, the method comprising:

providing an elongated wire formed of wear-resistant steel, and an elongated backing strip formed of steel and defining a first side, a second side, and opposing lateral edges extending between the first and second sides;

placing the wire in contact with a lateral edge of the backing strip;

applying thermal energy to an interface between the wire and the backing strip to weld the wire to the backing strip, and forming a composite strip defining a first metal portion formed by the steel backing strip, a second metal portion formed by the wear-resistant steel wire, and a weld region joining the first and second metal portions and extending from approximately one end of the second metal portion to approximately the other end of the second metal portion;

heat treating the composite strip;

forming at least one facet into the second metal portion, and forming an approximately straight wear-resistant steel cutting edge on the composite strip; and die cutting the composite strip at a plurality of score lines to thereby separate the blades from the composite strip.

26. A method as defined in claim 25, further comprising hardening the first metal portion to a first hardness, and hardening the second metal portion to a second hardness greater than the first hardness.

27. A method as defined in claim 25, further comprising hardening the first metal portion to a surface hardness within the range of approximately 38 Rc to approximately 52 Rc.

28. A method as defined in claim 25, further comprising hardening the second metal portion to a surface hardness within the range of approximately 60 Rc to approximately 75 Rc.

29. A method of making composite utility knife blades, the method comprising:

providing an elongated wire formed of wear-resistant steel, and an elongated backing strip formed of steel and defining a first side, a second side, and opposing lateral edges extending between the first and second sides;

placing the wire in contact with a lateral edge of the backing strip;

applying thermal energy to an interface between the wire and the backing strip to weld the wire to the backing strip, and forming a composite strip defining a first metal portion formed by the steel backing strip, a second metal portion formed by the wear-resistant steel wire, and a weld region joining the first and second metal portions and extending from approximately one end of the second metal portion to approximately the other end of the second metal portion;

forming a plurality of notches axially spaced relative to each other in the first metal portion of the composite strip;

heat treating the composite strip;

forming at least one facet into the second metal portion, and forming an approximately straight wear-resistant steel cutting edge on the composite strip; and die cutting the composite strip at a plurality of axially spaced locations to thereby form a plurality of composite utility knife blades from the composite strip.

30. A method of making a composite utility knife blade, wherein the blade comprises a first metal portion forming a backing, a second metal portion defining a cutting edge, and a weld region joining the first and second metal portions, the method comprising the steps of:

providing a wire formed of wear-resistant steel, and a backing strip formed of steel and defining a first side, a second side, and opposing edges extending between the first and second sides;

placing the wire in contact with an edge of the backing strip;

applying thermal energy to an interface between the wire and the backing strip to weld the wire to the backing strip, and forming a composite strip defining the first metal portion formed by the steel backing strip, the second metal portion formed by the wear-resistant steel wire, and the weld region joining the first and second metal portions and extending from approximately one end of the second metal portion to approximately the other end of the second metal portion;

forming a plurality of apertures in the first metal portion that are axially spaced relative to each other and configured for engaging a blade holder, or the blade actuating mechanism or locator of a blade holder;

heat treating the composite strip; and forming at least one facet into the second metal portion and, in turn, forming an approximately straight wear-resistant steel cutting edge on the composite strip.

31. A method of making a composite utility knife blade as defined in claim 30, further comprising hardening the first metal portion to a surface hardness within the range of approximately 38 Rc to approximately 52 Rc.

32. A method of making a composite utility knife blade as defined in claim 30, further comprising hardening the second metal portion to a surface hardness within the range of approximately 60 Rc to approximately 75 Rc.

33. A method of making a composite utility knife blade as defined in claim 30, further comprising separating the composite strip at a plurality of axially spaced locations to thereby form a plurality of composite utility knife blades from the composite strip.

34. A method of making a composite utility knife blade as defined in claim 30, further comprising hardening the first metal portion to a first hardness, and hardening the second metal portion to a second hardness greater than the first hardness.

35. A method of making a composite utility knife blade, wherein the blade comprises a first metal portion forming a backing, a second metal portion defining a cutting edge, and a weld region joining the first and second metal portions, the method comprising the steps of:

providing a wire formed of wear-resistant steel, and a backing strip formed of steel and defining a first side, a second side, and opposing edges extending between the first and second sides;

placing the wire in contact with an edge of the backing strip;

applying thermal energy to an interface between the wire and the backing strip to weld the wire to the backing strip, and forming a composite strip defining the first metal portion formed by the steel backing strip, the second metal portion formed by the wear-resistant steel wire, and the weld region joining the first and second metal portions;

heat treating the composite strip;

forming at least one facet into the second metal portion, and forming an approximately straight wear-resistant steel cutting edge on the composite strip;

forming a plurality of registration apertures extending through the first metal portion and axially spaced relative to each other; and separating from the composite strip at least one of the first and second metal portions with reference to a registration aperture by inserting a positioning device in the respective aperture to position the composite strip relative to a separating apparatus.

36. A method of making composite utility knife blades, wherein each blade comprises a first metal portion forming a backing, a second metal portion defining a cutting edge, and a weld region joining the first and second metal portions, the method comprising the steps of:
   providing a wire formed of wear-resistant steel, and a backing strip formed of steel and defining a first side, a second side, and opposing edges extending between the first and second sides;
   placing the wire in contact with an edge of the backing strip;
   applying thermal energy to an interface between the wire and the backing strip to weld the wire to the backing strip, and forming a composite strip defining the first metal portion formed by the steel backing strip, the second metal portion formed by the wear-resistant steel wire, and the weld region joining the first and second metal portions and extending from approximately one end of the second metal portion to approximately the other end of the second metal portion;
   heat treating the composite strip;
   forming at least one facet into the second metal portion, and forming an approximately straight wear-resistant steel cutting edge on the composite strip; and
   die cutting at least one of the first and second metal portions along shear lines axially spaced relative to each other to thereby form a plurality of utility knife blades from the composite strip.

37. A method as defined as defined in claim 36, wherein the shear lines are defined by scores.

38. A method as defined in claim 36, wherein the heat treating includes hardening the first metal portion to a first hardness, and hardening the second metal portion to a second hardness greater than the first hardness.

39. A method as defined in claim 38, wherein the heat treating further includes hardening the first metal portion to a surface hardness within the range of approximately 38 Rc to approximately 52 Rc, and hardening the second metal portion to a surface hardness within the range of approximately 60 Rc to approximately 75 Rc.

40. A method of making composite utility knife blades, wherein each blade comprises a first edge portion, a second edge portion defining a cutting edge, third and fourth edge portions extending between the first and second edge portions, a first metal portion defining the first edge portion and forming a backing extending from approximately the third edge portion to the fourth edge portion, a second metal portion defining the second edge portion and extending from approximately the third edge portion to the fourth edge portion, and a weld region joining the first and second metal portions, the method comprising:
   providing an elongated wire formed of wear-resistant steel, and an elongated backing strip formed of steel and defining an approximately planar first side, an approximately planar second side, and opposing lateral edges extending between the first and second sides;
   placing the wire in contact with one of the opposing lateral edges of the backing strip;
   applying thermal energy to an interface between the wire and the backing strip to weld the wire to the backing strip, and forming a composite strip defining a first metal portion formed by the steel backing strip, a second metal portion formed by the wear-resistant steel wire, and a weld region joining the first and second metal portions and extending from approximately one end of the second metal portion to approximately the other end of the second metal portion;
   heat treating the composite strip;
   forming at least one facet into the second metal portion, and farming an approximately straight wear-resistant steel cutting edge along the lateral edge of the composite strip defined by the second metal portion; and
   separating at least one of the first and second metal portions at axially spaced locations relative to each other to thereby form a plurality of utility knife blades from the composite strip.

41. A method as defined in claim 40, wherein the separating includes separating at least one of the first and second metal portions along shear lines axially spaced relative to each other to thereby form a plurality of utility knife blades from the composite strip.

42. A method as defined in claim 41, wherein each shear line is defined by a score.

43. A method as defined in claim 40, wherein the separating includes die cutting at least one of the first and second metal portions at axially spaced locations relative to each other to thereby form a plurality of utility knife blades from the composite strip.

44. A method as defined in claim 40, further comprising forming a plurality of utility knife blades defining peripheral configurations selected from the group including a trapezoidal peripheral configuration and a rectangular peripheral configuration.

45. A method as defined in claim 40, further comprising hardening the first metal portion to a first hardness, and hardening the second metal portion to a second hardness greater than the first hardness.

46. A method as defined in claim 40, further comprising hardening the first metal portion to a surface hardness within the range of approximately 38 Rc to approximately 52 Rc.

47. A method as defined in claim 40, further comprising hardening the second metal portion to a surface hardness within the range of approximately 60 Rc to approximately 75 Rc.

* * * * *

UNITED STATES PATENT AND TRADEMARK OFFICE
CERTIFICATE OF CORRECTION

PATENT NO. : 7,658,129 B2 Page 1 of 1
APPLICATION NO. : 10/792415
DATED : February 9, 2010
INVENTOR(S) : William B. Korb and Brian K. Douglas It is certified that error appears in the above-identified patent and that said Letters Patent is hereby corrected as shown below:

In the specification:

Column 18, line 19, "farming" should be changed to --forming--

Signed and Sealed this

Fifteenth Day of June, 2010

David J. Kappos
*Director of the United States Patent and Trademark Office*